US011070566B2

(12) United States Patent
Nabeesa et al.

(10) Patent No.: US 11,070,566 B2
(45) Date of Patent: Jul. 20, 2021

(54) SYSTEM AND METHOD TO SECURE RENEGOTIATION OF CONNECTIONS BETWEEN A BASEBOARD MANAGEMENT CONTROLLER AND A HOSTED AGENT

(71) Applicant: DELL PRODUCTS, LP, Round Rock, TX (US)

(72) Inventors: Faizal Saidalavi Nabeesa, Bengaluru (IN); Parmeshwr Prasad, Bangalore (IN); Rajib Saha, Bangalore (IN)

(73) Assignee: Dell Products L.P., Round Rock, TX (US)

(*) Notice: Subject to any disclaimer, the term of this patent is extended or adjusted under 35 U.S.C. 154(b) by 299 days.

(21) Appl. No.: 16/370,806

(22) Filed: Mar. 29, 2019

(65) Prior Publication Data
US 2020/0314115 A1 Oct. 1, 2020

(51) Int. Cl.
H04L 29/06 (2006.01)
H04L 9/08 (2006.01)

(52) U.S. Cl.
CPC ........ H04L 63/1408 (2013.01); H04L 9/0825 (2013.01); H04L 63/0435 (2013.01); H04L 63/0823 (2013.01); H04L 63/1458 (2013.01); H04L 63/205 (2013.01)

(58) Field of Classification Search
CPC ............. H04L 63/1408; H04L 63/0823; H04L 63/0435; H04L 63/1458; H04L 9/0825; H04L 63/205; H04L 9/0841; H04L 9/14; H04L 63/1441; H04L 63/166
See application file for complete search history.

(56) References Cited

U.S. PATENT DOCUMENTS

| 7,272,723 | B1 | 9/2007 | Abbott et al. |
| 9,667,601 | B2* | 5/2017 | Bollay ................ H04L 63/0442 |
| 2010/0242106 | A1* | 9/2010 | Harris ................ H04L 63/0884 726/15 |
| 2010/0325419 | A1* | 12/2010 | Kanekar ............. H04L 63/0471 713/151 |
| 2015/0371032 | A1 | 12/2015 | Puli et al. |

* cited by examiner

Primary Examiner — Mohammed Waliullah
(74) Attorney, Agent, or Firm — Larson Newman, LLP

(57) ABSTRACT

An information handling system includes a processor, a baseboard management controller (BMC) agent that establishes a Transport Layer Security (TLS) session including a first cryptographic parameter shared between the BMC and the BMC agent, receives a request to register the BMC agent with the BMC via the TLS session, and provides a second cryptographic parameter to the BMC agent. The BMC establishes a second TLS session including a third cryptographic parameter, determines that the second TLS session is suspected of being from a malicious agent, and renegotiates with the BMC agent using the second cryptographic parameter within the TLS session to share a fourth cryptographic parameter between the BMC and the first BMC agent in response to determining that the second TLS session is suspect.

20 Claims, 3 Drawing Sheets

US 11,070,566 B2

SYSTEM AND METHOD TO SECURE RENEGOTIATION OF CONNECTIONS BETWEEN A BASEBOARD MANAGEMENT CONTROLLER AND A HOSTED AGENT

FIELD OF THE DISCLOSURE

This disclosure generally relates to information handling systems, and more particularly relates to an event based mechanism to secure renegotiation of connections between a baseboard management controller and a hosted agent.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processor, a baseboard management controller (BMC) agent, and a BMC. The BMC may establish a Transport Layer Security (TLS) session including a first cryptographic parameter shared between the BMC and the BMC agent, receive a request to register the BMC agent with the BMC via the TLS session, and provide a second cryptographic parameter to the BMC agent. The BMC may establish a second TLS session including a third cryptographic parameter, determine that the second TLS session is suspected of being from a malicious agent, and renegotiate with the BMC agent using the second cryptographic parameter within the TLS session to share a fourth cryptographic parameter between the BMC and the first BMC agent in response to determining that the second TLS session is suspect.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
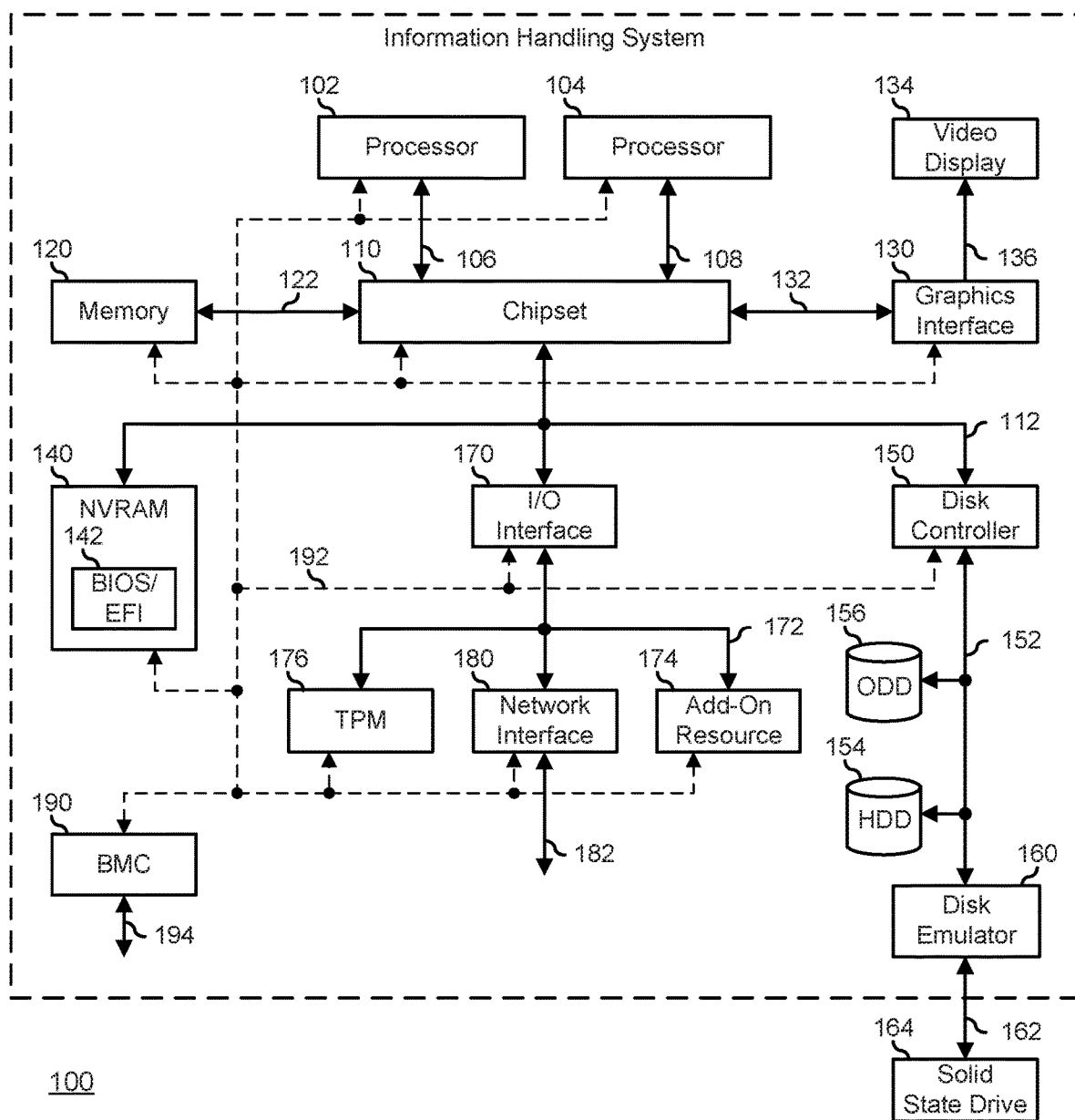
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid state drive (SSD) 164, an input/output (I/O) interface 170 connected to an add-on resource 174 and a trusted platform module (TPM 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manages the data flows between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface 180 includes a network interface card (NIC) or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like.

The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 180 can vary considerably based on the type of information handling system. BMC 190 can operate in accordance with an Intelligent Platform Management Interface (IPMI). An example of BMC 190 includes an Integrated Dell Remote Access Controller (iDRAC). Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller-Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code. BMC 190 operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image. BMC 190 utilizes various protocols and application programming interfaces (APIs) to direct and control the processes for monitoring and maintaining the system firmware. An example of a protocol or API for monitoring and maintaining the system firmware includes a graphical user interface (GUI) GUI associated with BMC 190, an interface defined by the Distributed Management Taskforce (DMTF) (such as a Web Services Management (WS-MAN) interface, a Management Component Transport Protocol (MCTP) or, a Redfish interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated onto another element of the information handling system such as chipset 110, or another suitable element, as needed or desired. As such, BMC 190 can be part of an integrated circuit or a chip set within information handling system 100. BMC 190 may operate on a separate power plane from other resources in information handling system 100, such as iDRAC, or the like. Thus BMC 190 can communicate with the remote management system via network interface 194 while the resources of information handling system 100 are powered off. Here, information can be sent from the remote management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, the information handling system may represent one of many hundreds or thousands of other enterprise class processing systems in the datacenter. In such an environment, the information handling system may represent one of a wide variety of different types of information handling systems that perform the main processing tasks of the datacenter, such as computing equipment (servers, modular blade systems, and the like), switching and routing equipment (network routers, top-of-rack switches, and the like), data storage equipment (storage servers, network attached storage, storage area networks, and the like), or other equipment which the datacenter uses to perform the processing tasks. Further, the information handling system may represent management equipment that is networked to the processing equipment via a separate management network, and that operates to monitor, manage, and maintain the processing equipment. Finally, the information handling system may represent datacenter service equipment that is utilized by service technicians of the datacenter to perform monitoring, management, service, and maintenance of the processing and management equipment of the data center. Such datacenter service equipment would historically include an information handling system on a "crash cart," but increasingly includes mobile devices such as tablet computing devices, smart phone devices, and the like.

Figure 2:
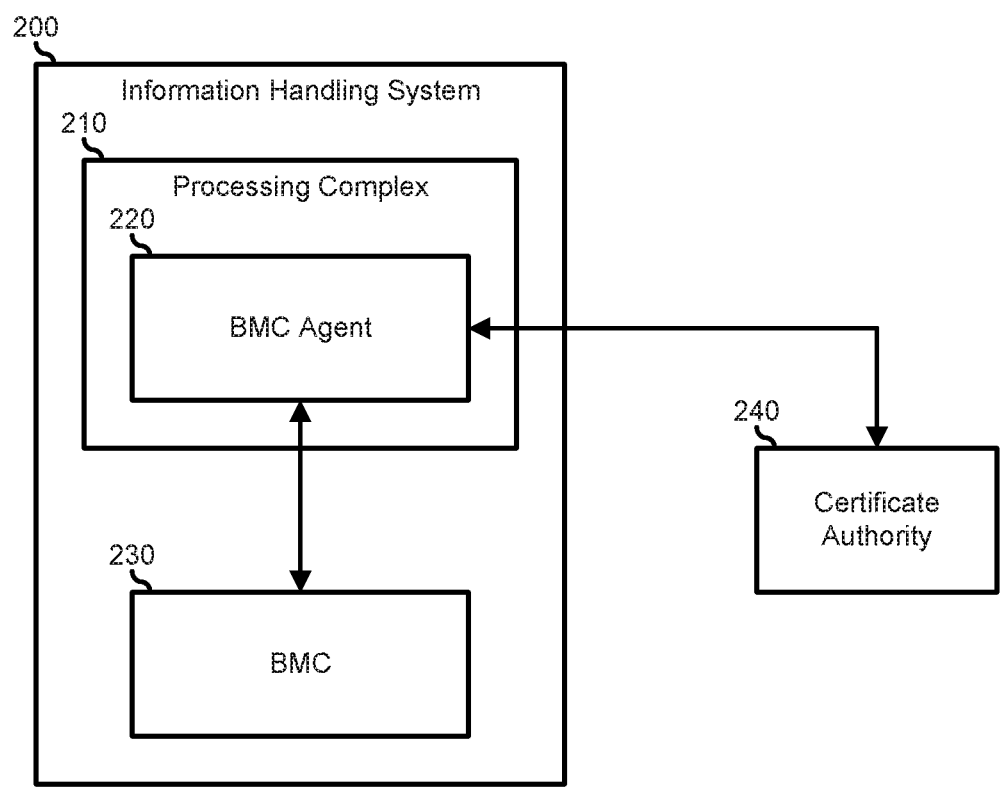
FIG. 2 is a block diagram of an information handling system according to another embodiment of the present disclosure.

FIG. 2 illustrates an information handling system 200 similar to information handling system 100, and including a processing complex 210 and baseboard management controller (BMC) 230. Processing complex 210 includes BMC agent 220. Processing complex 210 represents the hardware, software, firmware, and other elements associated with the performance of the processing tasks associated with information handling system 200. As such, processing complex 210 may be understood to include one or more data processors or processing cores, one or more input/output (I/O) devices such as processor, memory, or I/O controller hub, system memory including random access memory (RAM) and system read-only memory (ROM), mass data storage devices, video processors, network interface devices, or other devices typical to an information handling system, as needed or desired. Information handling system 200 represents a managed information handling system that monitors, manages, and maintains the elements of the information handling system by the communication of management information between various managing elements and the managed elements.

BMC agent 220 represents an element of processing complex 210 that runs in a hosted environment of the processing complex to provide a secure communication interface between the processing complex and BMC 230. An example of BMC agent 220 includes Dell-EMC OpenManage Server Administrator (OMSA), Dell-EMC iDRAC Service Module (iSM), or another management agent that runs in a hosted environment to provide secure communication between a processing complex and a BMC, as needed or desired. In a particular embodiment, BMC agent 220 communicates with BMC 230 via a Network Controller-Sideband Interface (NC-SI), NC-SI interface between the BMC and a network interface card (NIC) or host bust adapter (HBA) of information handling system 200. In another embodiment, BMC agent 220 communicates with BMC 230 via a USB NIC interface between the BMC and processing complex 210.

BMC 230 represents hardware and software architected into information handling system 200 and configured to operate out-of-band from processing complex 210. As such, BMC 230 is generally more secure against intrusion by malicious code, such as viruses, directed denial of service (DDOS) attacks, trojans, and the like. However, BMC agent 220, operating in the hosted environment of processing complex 210, is more vulnerable to such intrusions. For this reason, the communications between BMC agent 220 and BMC 230 is secured utilizing a Transport Layer Security (TLS) cryptographic protocol, so that the various attackers are less able to hack the functions and features of BMC 230. In accordance with the TLS protocol, BMC 230 operates as the server side of the TLS protocol, and BMC agent 220 operates as the client side of the TLS protocol. Here, when communications are established between BMC agent 220 and BMC 230, a handshake is performed between the BMC agent and the BMC to ensure that the BMC agent is authorized to communicate with the BMC, and vice versa. During the handshake process, BMC agent 220 and BMC 230 share a cryptographic parameter that is used to encrypt and decrypt data communicated between the BMC agent and the BMC. In a particular embodiment, the cryptographic parameter represents a symmetric cryptographic key that is used by both BMC agent 220 and BMC 230 to encrypt and decrypt the communications. In another embodiment, the cryptographic parameter represents the exchange of public keys in accordance with an asymmetric cryptographic scheme, where the BMC agent and the BMC each have their own public/private key pair, and they each share their public keys with the other. In a particular embodiment, when BMC agent 220 is installed on information handling system 200, BMC 230 generates a server public/private key pair and a client public/private key pair for the purposes of the handshaking, and the BMC provides the server public key and the client private key to the BMC agent. BMC agent 220 then stores the server public key and the client private key to a secure storage are of information handling system.

In conducting the TLS handshaking, as described further below, BMC agent 220 operates to contact a certificate authority 240 to verify a certificate provided by BMC 230, and the BMC verifies a certificate provided by the BMC agent. In particular cases, a malicious actor can obtain a valid client certificate, and thereby gain access to BMC 230. In a particular attack profile, a malicious actor utilizes the client certificate to successfully conduct a handshake with BMC 230, but after the handshaking is completed, neglects to perform the requisite steps to register to the BMC, thereby overtaxing the resources of the BMC, or DDOS attack.

Figure 3:
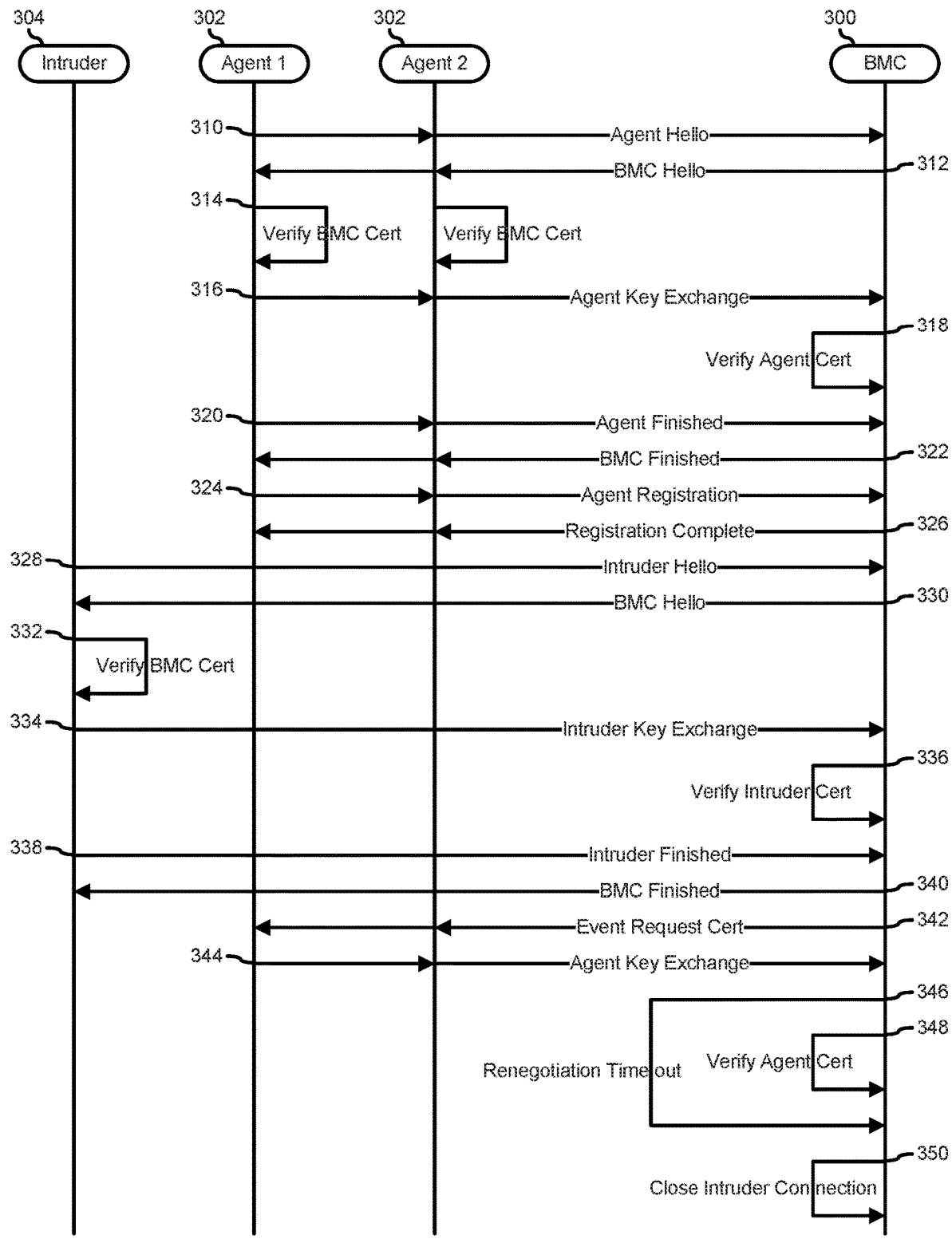
FIG. 3 is a diagram illustrating a method to secure renegotiation of connections between a baseboard management controller and a hosted agent according to an embodiment of the present disclosure.

FIG. 3 illustrates a method to secure renegotiation of connections between a BMC 300 and one or more BMC agents 302 against an intruder 304. The method includes a handshake between BMC 300 and BMC agent 302 in accordance with the TLS protocol in steps 310-322, a registration between the BMC and the BMC agent in steps 324-326, a handshake between the BMC and intruder 304 in steps 328-240, and a renegotiation event between steps 342-350.

In step 310, BMC agents 302 each send "client hello" messages that list cryptographic information including the TLS version and the CipherSuites supported by the BMC agents. In step 312, BMC 300 responds to each of BMC agents 302 with a "server hello" message that contains the CipherSuite chosen by the BMC from the list provided by BMC agents, the session IDs, BMC's digital certificate, and a "client certificate request" that includes a list of the types of certificates supported and the Distinguished Names of acceptable Certification Authorities (CAs). In step 314, BMC agents 302 each verify BMC 300's digital certificate. In step 316, BMC agents 302 each send random byte strings that enable both BMC agents and BMC 300 to compute secret keys to be used for encrypting subsequent message data. The random byte strings themselves are encrypted with BMC 300's public key. In addition, because BMC 300 transmitted the "client certificate request," BMC agents 302 each send a random byte string encrypted with the BMC agent's private key, together with each BMC agent's digital certificate. In step 318, BMC 300 verifies each of BMC agent 302's certificates. In step 320, BMC agents 302 each send BMC 300 a "finished" message, which is encrypted with the associated secret key, indicating that each BMC agent's part of the handshake is complete. In step 322, BMC 300 sends each of BMC agent 300 a "finished" message, which is encrypted with the associated secret key, indicating that the BMC part of the handshake is complete.

At this point, the TLS handshake is completed in accordance with the TLS protocol and, in the following TLS sessions, BMC 300 and BMC agents 302 exchange messages that are symmetrically encrypted with their associated shared secret keys. However, because BMC 300 and BMC agents 302 are all closely associated with a particular information handling system, being typically manufactured by a common manufacturer, here, BMC 300 and BMC agents 302 engage in a registration process subsequent to the handshaking. In the registration process, BMC 300 and BMC agents 302 can share common registration information that is established by the manufacturer that uniquely correlates the BMC and the BMC agents as being bone fide elements of the particular information handling system. For example, the registration information may include a commonly known shared key that keys a unique instance of BMC agent software with the hardware BMC, or that otherwise verifies the association between BMC 300 and BMC agents 302. Here, after the handshake between BMC 300 and BMC agents 302 is complete in step 324, the BMC agents each send an "agent registration" message that includes each BMC agent's registration information to the BMC in step 324. In step 326, BMC 300 sends a "registration complete" message to each of BMC agents 302 to complete the registration process. In a particular embodiment, the registration information represents an additional symmetric key or public/private key pairs that are utilized to further encrypt the communications between BMC 300 and BMC agents 302. In any case, the registration process provides a mechanism whereby communications from BMC 300 to BMC agents 302 can be broadcasted on a network fabric that connects the BMC and the BMC agents, and that are uniquely received and understood by the registered BMC agents.

In steps 328-340, intruder 304 attempts to initiate an attack by engaging in a handshake process with known certificates. In step 328, intruder 304 sends a "client hello" messages to BMC 300. In step 330, BMC 300 responds to intruder 304 with a "server hello" message with the BMC's digital certificate, and a "client certificate request." In step 332, intruder 304 verifies BMC 300's digital certificate. In step 334, intruder 304 sends a random byte strings that enables the intruder and BMC 300 to compute secret keys to be used for encrypting subsequent message data. In step 336, BMC 300 verifies intruder 304's certificate. In step 338, intruder 304 sends BMC 300 a "finished" message, indicating that the intruder's part of the handshake is complete. In step 340, BMC 300 sends intruder 304 a "finished" message, indicating that the BMC part of the handshake is complete. Note that, where intruder 300 is engaged in a DDOS attack, the handshake process as shown in steps 328-340 will be performed multiple times to overtax the resources of BMC 300. Further note that, because intruder 304 is not closely associated with BMC 300, the intruder fails to engage in the registration process with the BMC.

After intruder 304 has successfully performed the TLS handshake in steps 338-340, BMC 300 detects that the session established with the intruder is invalid. For example, BMC 300 may implement a timer associated with each TLS session, after which, if no registration event occurs, the session is deemed to be suspect, or the BMC may detect when a number of unregistered sessions exceeds a threshold, and the BMC is deemed to be under a DDOS attack. The mechanisms for detecting malicious activity by intruder 304 are known in the art and will not be further discussed herein, except as needed to illustrate the present embodiments.

When BMC 300 determines that one or more TLS session is suspect, the BMC initiates a renegotiation event with the registered BMC clients 302, as shown in steps 342-350. In step 342, BMC 300 initiates a "renegotiation request" message 342. In a particular embodiment, the renegotiation request message is broadcast on the network that includes BMC agents 302 and intruder 304, but the renegotiation request message is encrypted with the additional symmetric key or public/private key pair. In another embodiment, where each BMC agent is uniquely keyed to BMC 300, BMC sends individual renegotiation request messages to each registered BMC agent using the unique key association to identify the target of the request. In either case, BMC agents 302 decrypt and detect the renegotiation request message, but intruder 304 is unable to decrypt the renegotiation request message, and/or is therefore unable to detect the renegotiation request. Note here that BMC agents 302 do not need to verify the BMC digital certificate because to the secure nature of transmission of the renegotiation request message. In step 344, BMC agents 302 each send a new random byte string that enables both the BMC agents and BMC 300 to compute new secret keys to be used for encrypting subsequent message data. In block 346, a renegotiation timeout is initiated, and in block 348, BMC 300 verifies BMC agent's 302 certificates, and the renegotiation event is complete for the BMC agents. When the renegotiation timeout has timed out, all intruder connections are closed in step 350. That is, any TLS sessions that have not successfully competed the renegotiation event are deemed to be invalid and those sessions are closed.

For purpose of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:
1. An information handling system, comprising:
   a processor that executes a first baseboard management controller (BMC) agent; and
   a BMC configured to communicate with the processor, the BMC configured to:
      establish a first Transport Layer Security (TLS) session with the first BMC agent, wherein the first TLS session includes a first cryptographic parameter shared between the BMC and the first BMC agent;
      receive a first request from the first BMC agent via the first TLS session, the first request to register the first BMC agent with the BMC;
      provide a second cryptographic parameter to the first BMC agent in response to the first request;

establish a second TLS session, wherein the second TLS session includes a third cryptographic parameter;

determine that the second TLS session is suspected of being from a malicious agent; and renegotiate with the first BMC agent using the second cryptographic parameter within the first TLS session to share a fourth cryptographic parameter between the BMC and the first BMC agent in response to determining that the second TLS session is suspect.

2. The information handling system of claim 1, wherein the second cryptographic parameter is a symmetric encryption key.

3. The information handling system of claim 1, wherein the second cryptographic parameter is a BMC public/private key pair and a BMC agent public/private key pair.

4. The information handling system of claim 1, wherein the BMC is further configured to:

determine that no request for registration with the BMC is received in association with the second TLS session, wherein the determination that the second TLS session is suspected of being from a malicious agent is based upon the determination that no request for registration with the BMC was received in association with the second TLS session.

5. The information handling system of claim 1, wherein the BMC is further configured to:

determine that the second TLS session is associated with a directed denial of service (DDOS) attack, wherein the determination that the second TLS session is suspected of being from a malicious agent is based upon the determination that the second TLS session is associated with the DDOS attack.

6. The information handling system of claim 1, wherein the BMC is further configured to:

establish a third TLS session with a second BMC agent, wherein the third TLS session includes a fifth cryptographic parameter shared between the BMC and the second BMC agent;

receive a second request from the second BMC agent via the third TLS session, the second request to register the second BMC agent with the BMC;

provide a sixth cryptographic parameter to the second BMC agent in response to the second request; and renegotiate with the second BMC agent using the sixth cryptographic parameter within the third TLS session to share a seventh cryptographic parameter between the BMC and the second BMC agent in further response to determining that the second TLS session is suspect.

7. The information handling system of claim 6, wherein the second and sixth cryptographic parameters are a common cryptographic parameter.

8. The information handling system of claim 7, wherein in renegotiating with the first and second BMC agents, the BMC broadcasts a renegotiation request encrypted based upon the common cryptographic parameter.

9. The information handling system of claim 6, wherein the second and sixth cryptographic parameters are different cryptographic parameters.

10. The information handling system of claim 9, wherein:

in renegotiating with the first BMC agent, the BMC sends a first renegotiation request encrypted based upon the second cryptographic parameter to the first BMC agent; and in renegotiating with the second BMC agent, the BMC sends a second renegotiation request encrypted based upon the sixth cryptographic parameter to the second BMC agent.

11. A method, comprising:

establishing, by a baseboard management controller (BMC) of an information handling system, a first Transport Layer Security (TLS) session with a first BMC agent of the information handling system, wherein the first TLS session includes a first cryptographic parameter shared between the BMC and the first BMC agent;

receiving, by the BMC, a first request from the first BMC agent via the first TLS session, the first request to register the first BMC agent with the BMC;

providing, by the BMC, a second cryptographic parameter to the first BMC agent in response to the first request;

establishing, by the BMC, a second TLS session, wherein the second TLS session includes a third cryptographic parameter;

determining, by the BMC, that the second TLS session is suspected of being from a malicious agent; and renegotiating, by the BMC, with the first BMC agent using the second cryptographic parameter within the first TLS session to share a fourth cryptographic parameter between the BMC and the first BMC agent in response to determining that the second TLS session is suspect.

12. The method of claim 11, wherein the second cryptographic parameter is a symmetric encryption key.

13. The method of claim 11, wherein the second cryptographic parameter is a BMC public/private key pair and a BMC agent public/private key pair.

14. The method of claim 11, further comprising:

determining, by the BMC, that no request for registration with the BMC is received in association with the second TLS session, wherein the determination that the second TLS session is suspected of being from a malicious agent is based upon the determination that no request for registration with the BMC was received in association with the second TLS session.

15. The method of claim 11, further comprising:

determining, by the BMC, that the second TLS session is associated with a directed denial of service (DDOS) attack, wherein the determination that the second TLS session is suspected of being from a malicious agent is based upon the determination that the second TLS session is associated with the DDOS attack.

16. The method of claim 11, further comprising:

establishing, by the BMC, a third TLS session with a second BMC agent, wherein the third TLS session includes a fifth cryptographic parameter shared between the BMC and the second BMC agent;

receiving, by the BMC, a second request from the second BMC agent via the third TLS session, the second request to register the second BMC agent with the BMC;

providing, by the BMC, a sixth cryptographic parameter to the second BMC agent in response to the second request; and renegotiating, by the BMC, with the second BMC agent using the sixth cryptographic parameter within the third TLS session to share a seventh cryptographic parameter between the BMC and the second BMC agent in further response to determining that the second TLS session is suspect.

17. The method of claim 16, wherein the second and sixth cryptographic parameters are a common cryptographic parameter.

18. The method of claim 17, wherein the second and sixth cryptographic parameters are different cryptographic parameters.

19. A baseboard management controller (BMC) of an information handling system, the BMC comprising:
 a processor; and
 a memory in communication with the processor and storing code to:
  establish a first Transport Layer Security (TLS) session with a first BMC agent of the information handling system, wherein the first TLS session includes a first cryptographic parameter shared between the BMC and the first BMC agent;
  receive a first request from the first BMC agent via the first TLS session, the first request to register the first BMC agent with the BMC;
  provide a second cryptographic parameter to the first BMC agent in response to the first request;
  establish a second TLS session, wherein the second TLS session includes a third cryptographic parameter;
  determine that the second TLS session is suspected of being from a malicious agent; and
  renegotiate with the first BMC agent using the second cryptographic parameter within the first TLS session to share a fourth cryptographic parameter between the BMC and the first BMC agent in response to determining that the second TLS session is suspect.

20. The BMC of claim 19, wherein the code is further configured to:
 establish a third TLS session with a second BMC agent, wherein the third TLS session includes a fifth cryptographic parameter shared between the BMC and the second BMC agent;
 receive a second request from the second BMC agent via the third TLS session, the second request to register the second BMC agent with the BMC;
 provide a sixth cryptographic parameter to the second BMC agent in response to the second request; and
 renegotiate with the second BMC agent using the sixth cryptographic parameter within the third TLS session to share a seventh cryptographic parameter between the BMC and the second BMC agent in further response to determining that the second TLS session is suspect.

* * * * *